(12) United States Patent
Chandnani et al.

(10) Patent No.: US 10,372,769 B2
(45) Date of Patent: Aug. 6, 2019

(54) DISPLAYING RESULTS, IN AN ANALYTICS VISUALIZATION DASHBOARD, OF FEDERATED SEARCHES ACROSS REPOSITORIES USING AS INPUTS ATTRIBUTES OF THE ANALYTICS VISUALIZATION DASHBOARD

(71) Applicant: HEWLETT PACKARD ENTERPRISE DEVELOPMENT LP, Houston, TX (US)

(72) Inventors: Ashok Chandnani, Pontiac, MI (US); Kevin E. Matthews, Pontiac, MI (US); Kirk Alan Kaufman, Pontiac, MI (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 421 days.

(21) Appl. No.: 15/090,091

(22) Filed: Apr. 4, 2016

(65) Prior Publication Data
US 2017/0286549 A1 Oct. 5, 2017

(51) Int. Cl.
G06F 16/9535 (2019.01)
G06F 16/81 (2019.01)
G06F 16/25 (2019.01)
G06F 16/24 (2019.01)

(52) U.S. Cl.
CPC .......... *G06F 16/9535* (2019.01); *G06F 16/24* (2019.01); *G06F 16/256* (2019.01); *G06F 16/81* (2019.01)

(58) Field of Classification Search
CPC ......... G06F 17/30864; G06F 17/30566; G06F 16/24
See application file for complete search history.

(56) References Cited

U.S. PATENT DOCUMENTS

| 7,548,909 | B2 | 6/2009 | Rappaport et al. |
| 7,792,857 | B1 * | 9/2010 | Brette ............... G06F 17/30864 707/771 |
| 8,863,297 | B2 | 10/2014 | Sharma et al. |
| 8,990,958 | B2 | 3/2015 | Micucci et al. |

(Continued)

FOREIGN PATENT DOCUMENTS

WO WO-2015123540 8/2015

OTHER PUBLICATIONS

Kostkova, P. et al.; Integration and Visualization Public Health Dashboard: the Medi+board Pilot Project; http://wwwconference.org/proceedings/www2014/companion/p657.pdf; Apr. 7-11, 2014.

*Primary Examiner* — Charles E Lu

(57) ABSTRACT

Examples receive an input indicating a Graphical User Interface (GUI) selection of an attribute displayed in an analytics visualization dashboard, where the selected attribute is associated with a search term. Some examples perform a federated search across a plurality of repositories using the search term and through a content web service. Some examples obtain results of the federated search performed in the repositories, the results being content metadata associated to the search term, the content metadata relating to contents stored in the repositories and the content metadata including links to the contents. Some examples display the content metadata in the analytics visualization dashboard and provide access, through the links, to the contents associated with the displayed content metadata.

14 Claims, 4 Drawing Sheets

(56) References Cited

U.S. PATENT DOCUMENTS

| | | |
|---|---|---|
| 9,135,311 B2 | 9/2015 | Decker et al. |
| 2006/0026176 A1* | 2/2006 | Dettinger .......... G06F 17/30566 |
| 2007/0130113 A1 | 6/2007 | Ting |
| 2009/0216634 A1 | 8/2009 | Peltonen et al. |
| 2010/0017366 A1* | 1/2010 | Robertson ......... G06F 17/30528 |
| 2011/0320527 A1* | 12/2011 | Turakhia ................ G06Q 10/00 |
| | | 709/203 |
| 2013/0069990 A1* | 3/2013 | Geise .................... G06F 3/0485 |
| | | 345/660 |
| 2013/0219176 A1* | 8/2013 | Akella ................ H04L 63/0815 |
| | | 713/165 |
| 2014/0236972 A1* | 8/2014 | William ............ G06F 17/30292 |
| | | 707/755 |
| 2015/0169686 A1* | 6/2015 | Elias ................. G06F 17/30463 |
| | | 707/718 |

* cited by examiner

300

┌─────────────────────────────────────────────┐
│ RECEIVING AN INPUT RELATIVE TO AN           │ 301
│ ATTRIBUTE DISPLAYED IN THE ANALYTICS        │
│ VISUALIZATION DASHBOARD, THE ATTRIBUTE      │
│ BEING ASSOCIATED TO A SEARCH TERM           │
└─────────────────────────────────────────────┘
                      ↓
┌─────────────────────────────────────────────┐
│ PERFORMING A FEDERATED SEARCH ACROSS A      │ 302
│ PLURALITY OF REPOSITORIES USING THE         │
│ SEARCH TERM                                 │
└─────────────────────────────────────────────┘
                      ↓
┌─────────────────────────────────────────────┐
│ OBTAINING RESULTS OF THE FEDERATED          │ 303
│ SEARCH, WHEREIN THE RESULTS ARE CONTENT     │
│ METADATA RELATED TO CONTENTS STORED IN      │
│ THE PLURALITY OF REPOSITORIES               │
└─────────────────────────────────────────────┘
                      ↓
┌─────────────────────────────────────────────┐
│ DISPLAYING THE CONTENT METADATA IN THE      │ 304
│ ANALYTICS VISUALIZATION DASHBOARD AND       │
│ PROVIDING ACCESS TO CONTENTS ASSOCIATED     │
│ WITH THE DISPLAYED CONTENT METADATA         │
└─────────────────────────────────────────────┘

FIG. 3

DISPLAYING RESULTS, IN AN ANALYTICS VISUALIZATION DASHBOARD, OF FEDERATED SEARCHES ACROSS REPOSITORIES USING AS INPUTS ATTRIBUTES OF THE ANALYTICS VISUALIZATION DASHBOARD

BACKGROUND

The growth of social media and information sources on the Internet has highlighted the need to obtain digital contents related to specific topics from various information sources. The contents may be enhanced and enriched derivatives produced by entities, such as documents, commentaries, renditions, movie trailers, music remixes, etc. Analytics systems provide very powerful visualization tools that show aggregations and results of computations on widgets such as heatmaps, graphs, scatter plots, etc., on an analytics visualization dashboard. Each of these widgets represents attributes (elements, topics, information or subjects plotted on the dashboard).

BRIEF DESCRIPTION OF THE DRAWINGS

Features of the present disclosure are illustrated by way of example and not limited in the following figure(s), in which like numerals indicate like elements, in which:

FIG. 3 is a flowchart of an example method of performing a federated search across a plurality of repositories with inputs driven by an analytics visualization dashboard including displaying content metadata in the analytics visualization dashboard and providing access to the contents associated with the displayed content metadata;

DETAILED DESCRIPTION

Figure 1:
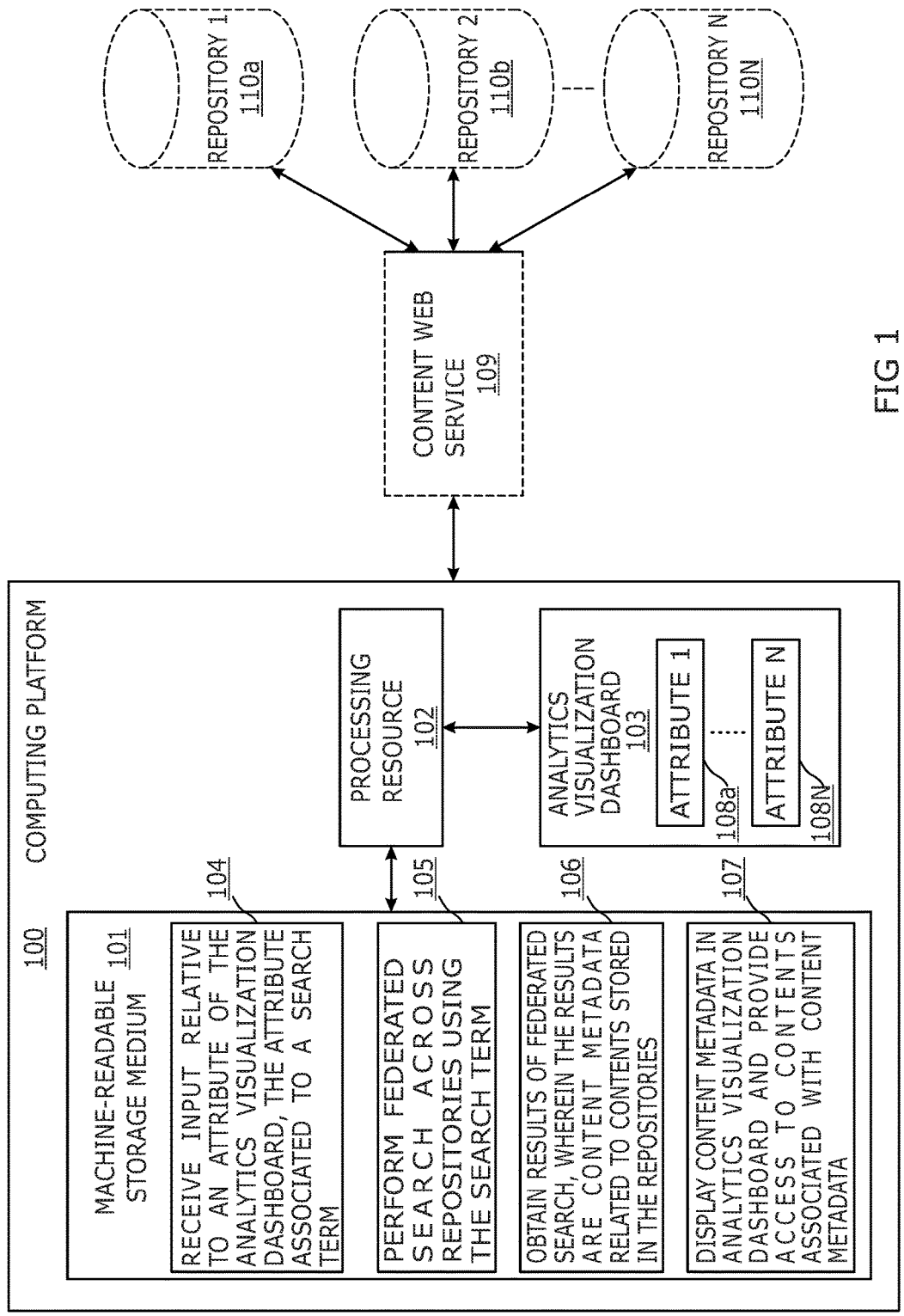
FIG. 1 is a simplified schematic block diagram of an example of computing platform for performing federated content search across a plurality of repositories with inputs driven by an analytics visualization dashboard.

Analytics systems provide visualization tools, such as analytics visualization dashboards, that show aggregations and results of computations on widgets such as heatmaps, graphs, scatter plots or candlestick diagrams. Each of these widgets represent attributes (elements, topics, information or subjects plotted on the dashboard). A large variety of digital content (especially in the media or advertising industry) is often subjected to being judged and discussed in scenarios such as social networks or blogs. Digital content is usually stored on either digital or analog storage in specific formats. Forms of digital content include information that is digitally broadcast, streamed or contained in computer files. Examples of digital content may be: media files (i.e., documents), their derivatives, commentaries, audio, image or video files, reviews relating to movies, conversations or social media contributions that may describe feelings and sentiment of people around particular digital content. The digital content may be stored in one or many digital asset management repositories. Many related digital media files may also be stored in public internet repositories and social media systems.

However, there is no way to connect these attributes with related digital content so these attributes cannot be used to perform a search against media repositories to find assets whose metadata contains such values. Thus, current analytics visualization dashboards are not able to automatically perform a federated content search having as input an attribute clicked by a user from the dashboard, and wherein, the results of the federated content search are automatically presented in an integrated way on the dashboard itself. Not having such a capability leads to digital content becoming latent and unused in repositories for long period of time. Also, current analytics visualization dashboards are not able to discover digital contents that may be "somewhat related" or "distantly related" to the attributes.

To address these issues, examples described herein may perform a federated content search of digital content across multiple repositories based on an attribute clicked by a user in the analytics visualization dashboard. The attribute may correspond to a topic, information, media asset or data that is depicted in the dashboard and it comprises a search term. Once the attribute is selected and the federated content search is launched by the user, a script initiates an API Call to a content web service passing the search term relative to the clicked attribute to the different repositories. These repositories will return metadata pointing to contents stored in the repositories wherein said metadata is related to the search term.

Therefore, the described examples of analytics visualization dashboard may be able to automatically perform a federated content search across a plurality of repositories, wherein the search term used to perform the federated content search may be associated to an input corresponding to an attribute clicked by a user from the dashboard itself. Besides, the results of the federated content search, which may be content metadata including links to the related content, may be automatically presented in an integrated way on the dashboard so the user is able to launch content (when needed for viewing or playing back) from the same analytics visualization dashboard instead of going to a separate window.

Federated content search may be an information retrieval technology that allows the simultaneous search of multiple searchable content resources. A user makes a single content query request that is distributed to the search engines, databases or other query engines participating in the federation. The federated content search then may aggregate the results that are received from the search engines for presentation to the user.

In such examples, the content web service may be configured to perform different searches in specific repositories, depending on pre-established search configurations, in order to improve the quality of the results obtained, by taking full advantage of the richness of metadata in a given repository.

The analytics visualization dashboard may display a list of interactive results from the performed federated search in the dashboard itself, for easy viewing and/or playback of the searched digital contents. Said list may show results with URLs, thumbnails and other relevant content and repository metadata related to the content to which it refers and to the repository in which it is stored. It allows a correlation between digital contents to points of interest (attributes) in the analytics dashboard. It further allows to discover the digital contents across multiple repositories and allows users to see those in conjunction with analytics data usually shown in the analytics visualization dashboards.

With reference first to FIG. 1, there is shown a block diagram of a computing platform 100 that is to execute a method for displaying results, in an analytics visualization dashboard, of a federated search across a plurality of repositories using as search term an attribute of the analytics visualization dashboard itself, according to an example of the present disclosure. It should be understood that the computing platform depicted in FIG. 1 may include additional components and that some of the components described herein may be removed and/or modified without departing from a scope of the computing platform 100.

The results displayed are metadata related to digital contents stored in a plurality of repositories 110*a*-110N, in which "N" represents an integer value greater than one. The repositories 110*a*-110N are heterogeneous content sources. Examples of heterogeneous content sources may include a social media source, a blog source, a news source, a document repository source, an online retailer source, an email source, a discussion forum source, etc.

The computing platform 100 may be a personal computer, a server computer, a smartphone, a tablet computer, or the like. The computing platform 100 is depicted as including a processing resource 102 and a machine-readable storage medium 101. The processing resource 102 may be any of a central processing unit (CPU), a semiconductor-based microprocessor, an application specific integrated circuit (ASIC), and/or other hardware device suitable for retrieval and execution of instructions stored in the machine-readable storage medium 101. The processing resource 102 may fetch, decode, and execute instructions, such as the instructions 104-107 stored on the machine-readable storage medium 101.

That is, the processing resource 102 may execute the instructions 104-107 to receive inputs relative to attributes of the analytics visualization dashboards, wherein the attributes are associated to a search term 104, perform a federated search across repositories using the search term 105, obtain results of the federated search, the results being content metadata related to contents stored in the repositories 106 and display the content metadata in the analytics visualization dashboard and provide access to the contents associated with said displayed content metadata 107. As an alternative or in addition to retrieving and executing instructions, the processing resource 102 may include one or more electronic circuits that include electronic components for performing the functionalities of the instructions 104-107. These processes are described in detail below.

The machine-readable storage medium 101 may be any electronic, magnetic, optical, or other physical storage device that contains or stores executable instructions. Thus, the machine-readable storage medium 101 may be, for example, Random Access Memory (RAM), an Electrically Erasable Programmable Read-Only Memory (EEPROM), a storage device, an optical disc, and the like. In some implementations, the machine-readable storage medium 101 may be a non-transitory machine-readable storage medium, where the term "non-transitory" does not encompass transitory propagating signals.

As described in detail below, the processing resource 102 may execute the instructions 104-107 to display, in the analytics visualization dashboard, the results of a federated search across the plurality of repositories using as search term an attribute of the analytics visualizations dashboard itself. In one regard, execution of the instructions 104-107 may enable retrieved content metadata to be displayed in the dashboard itself allowing user access to said content in an easy and automatic manner.

The computing platform 100 may further include the analytics visualization dashboard 103, as an input/output interface, through which the processing resource 102 may communicate with external repositories 110*a*-110N. The analytics visualization dashboard 103 may show a plurality of attributes 108*a*-108N, in which "N" represents an integer value greater than one, each one of the attributes 108*a*-108N including a search term that define the attribute itself.

The federated content search across the repositories 110*a*-110N is performed through a content web service 109. Web services are self-contained applications based on open standards that can be invoked over the Web. The content web services may use Simple Object Access Protocol (SOAP), Web Service Description Language (WSDL) or Universal Description, Discovery and Integration (UDDI). RESTful Web services use HTTP requiring less bandwidth and improving performance for data that can be retrieved.

Figure 2:
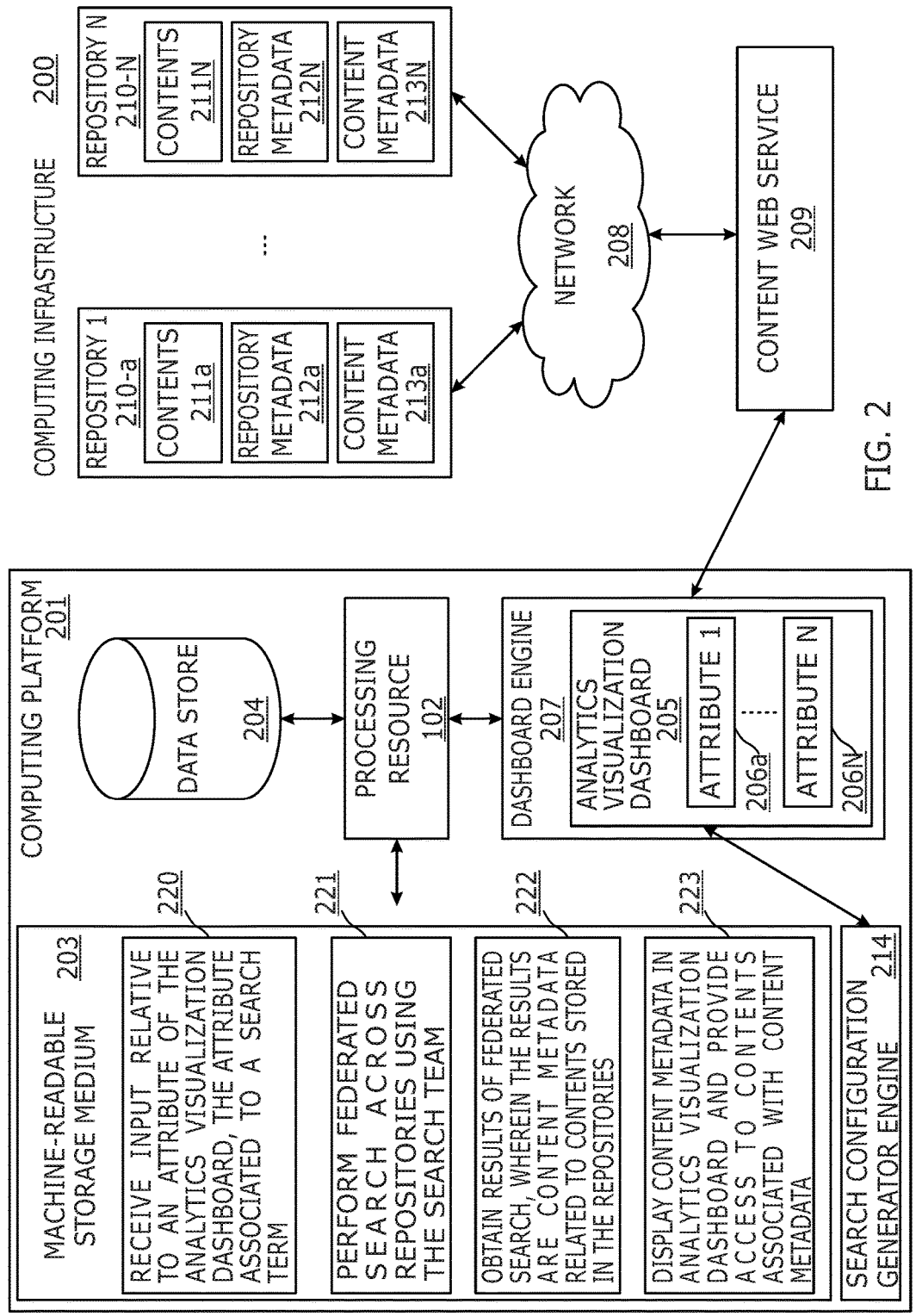
FIG. 2 is a simplified schematic block diagram of a system including the computing platform, a content web service and a plurality of content repositories, according to an example of the present disclosure.

With reference to FIG. 2, there is shown a block diagram of a computing infrastructure 200 within which is contained a computing platform 201 that is to execute a method for displaying results, in an analytics visualization dashboard, of a federated search across a plurality of repositories using as search term an attribute of the analytics visualizations dashboard itself, according to an example of the present disclosure. It should be understood that the computing infrastructure 200 depicted in FIG. 2 may include additional components and that some of the components described herein may be removed and/or modified without departing from a scope of the computing infrastructure 200.

As shown, the computing infrastructure 200 may include a computing platform 201. The computing platform 201 may be a personal computer, a server computer, a smartphone, a tablet computer, or the like. The computing platform 201 is depicted as including a processing resource 202 and a machine-readable storage medium 203. The processing resource 202 may be any of a central processing unit (CPU), a semiconductor-based microprocessor, an application specific integrated circuit (ASIC), and/or other hardware device suitable for retrieval and execution of instructions stored in the machine-readable storage medium 203. The processing resource 202 may fetch, decode, and execute instructions, such as the instructions 220-223 stored on the machine-readable storage medium 203.

That is, the processing resource 202 may execute the instructions 220-223 to receive inputs relative to attributes of the analytics visualization dashboards, wherein the attributes are associated to a search term 220, perform a federated search across repositories using the search term 221, obtain results of the federated search, the results being content metadata related to contents stored in the repositories 222 and display content metadata in the analytics visualization dashboard and provide access to the contents associated with displayed content metadata 223. As an alternative or in addition to retrieving and executing instructions, the processor 202 may include one or more electronic circuits that include electronic components for performing the functionalities of the instructions 220-223. These processes are described in detail below.

The machine-readable storage medium 203 may be any electronic, magnetic, optical, or other physical storage device that contains or stores executable instructions. Thus, the machine-readable storage medium 203 may be, for example, Random Access Memory (RAM), an Electrically Erasable Programmable Read-Only Memory (EEPROM), a storage device, an optical disc, and the like. In some implementations, the machine-readable storage medium 203 may be a non-transitory machine-readable storage medium, where the term "non-transitory" does not encompass transitory propagating signals.

As described in detail below, the processing resource 202 may execute the instructions 220-223 to display the results, in the analytics visualization dashboard, of a federated search across the plurality of repositories using as search term the attribute of the analytics visualizations dashboard itself. In one regard, execution of the instructions 220-223 may enable retrieved content to be displayed in the dashboard itself allowing user access to said content in an easy and automatic manner.

As also shown in FIG. 2, the computing platform 201 may also include a data store 204 wherein an in-memory table storing the metadata pointing to the contents related to the selected attribute is stored. The metadata may be retrieved by the analytics visualization dashboard 205 from the in-memory table. The data store 204 may also store other information, such as keywords or terms relative to the selected attributes, an historical record of selected attributes, etc. The computing platform 201 may further include a dashboard engine 207 able to generate different kinds of analytics visualization dashboards and to modify an analytics visualization dashboard according to the processing resource 202 instructions. The analytics visualization dashboard 205 is an input/output interface through which the processing resource 202 may communicate with external repositories and/or devices over a network 208, which may be a local area network, a wide area network, the Internet, etc. The analytics visualization dashboard 205 may show a plurality of attributes 206a-206N, in which "N" represents an integer value greater than one, each of the attributes including a search term that defines the attribute itself.

In one example, the processing resource 201 may communicate with a plurality of repositories 210a-210N, in which "N" represents an integer value greater than one. Each of the repositories 210a-210N may be a data repository or other data storage device and may store contents 211a-211N, repository metadata 212a-212N, and content metadata 213a-213N. By way of example, the repositories 210a-210N may include blogs, social networks, news sites, online retailers, document repositories, email clients, discussion forums, etc. In addition, the contents 211a-211N may include documents, video, audio, emails, databases, discussion groups, online postings, sharepoint, tutorials, news articles, blueprints, invoices, bug reports, source code, etc. Repository metadata 212a-212N is metadata related to the repository in which the content is stored and it is common to all the contents stored in a single repository. Content metadata 213a-213N may further comprise data information such as last modified time, last modified date, creator, sender, receiver, user directory profiles, workflow information, etc.

The federated content search across the repositories 210a-210N is performed through a content web service 209. Web services are self-contained applications based on open standards that can be invoked over the Web. The content web services may use Simple Object Access Protocol (SOAP), Web Service Description Language (WSDL) or Universal Description, Discovery and Integration (UDDI). RESTful Web services use HTTP requiring less bandwidth and improving performance for data that can be retrieved.

In some examples, analytics visualization dashboard 205 may also include a user interface that allows a user to specify those repositories in which the federated search have to be performed. For example, the user may select Repository A, from a pull down menu (providing an option to select among Repository A, Repository B, Repository C, etc.) in the analytics visualization dashboard 205, as the single content repository in which the federated search has to be performed.

The computing platform 201 may include hardware and/or software to enable the processing resource 202, through the analytics visualization dashboard 205, to communicate over the network 208. The computing platform 201 may enable a wired or wireless connection to the network 208. The computing platform 201 may further include a network interface card and/or may also include hardware and/or software to enable the processing resource 202 to communicate with various input and/or output devices, such as a keyboard, a mouse, a display, another computing device, etc., through which a user may input instructions into the computing platform 201 and may view outputs from the computing platform 201.

Computing platform 201 may further comprise a search configuration generator engine 214 to generate specific search configurations for each one of the repositories in which the federated content search is going to be performed. These search configurations may be stored in an internal memory (not shown) of the search configuration generator engine 214. Thus, the content web service 209 may perform different searches in specific repositories, depending on previously generated search configurations, in order to take full advantage of the richness of metadata in a given repository to improve the quality of the results obtained.

With reference to FIG. 3, there is shown a flowchart of an example method 300 of performing a federated search across a plurality of repositories with inputs driven by an analytics visualization dashboard including displaying content metadata in the analytics visualization dashboard and providing access to the contents associated with the displayed content metadata. Although execution of method 300 is described below with reference to computing platform 100 of FIG. 1, other suitable computing platforms or systems for the execution of method 300 may be utilized. Additionally, implementation of method 300 is not limited to such examples.

At 301 of method 300, an input relative to an attribute 108a displayed in the analytics visualization dashboard 103 may be received by the processing resource 102. The input may indicate a Graphical User Interface (GUI) selection of an attribute displayed in the analytics visualization dashboard 103. The attribute may be associate to a search term. In such examples, the input may be received in response to a clicking of a user on a specific attribute on a plot of the analytics visualization dashboard. In some examples, the analytics visualization dashboard 103 may show attributes (or popular topics) related to sentiment wherein data is collected from social media sites. The data source may be one single social media site or a combination of two or more social media sites. Data may be collected by means of social media Application Programming Interface (API) aggregators provided by third party social media providers. The data collection mechanism may utilize API Calls generated by a social media provider to fetch this data and populate it in a database of the analytics visualization dashboard to generate the heatmaps, plots, graphs, etc.

At 302 of method 300, the processing resource 102 launches a federated search across a plurality of repositories 110a-110N using the search term associated with the selected attribute. In some examples, when a user clicks on a specific attribute on a plot of the analytics visualization dashboard 103, a federated search against selected repositories using the search term to which the attribute refers is initiated. The federated search may be invoked using a web service invoker by selecting a button (e.g., via a click) residing in the analytics visualization dashboard. By selecting the button, a web service invoker, such as, for example, an IronPhyton script initiates a Representational State Transfer (Rest) Application Programming Interface (API) call to the content web service 109 passing the search term of the attribute to the content web service 109, that perform the federated search though.

At 303 of method 300, the results of the federated search are obtained wherein said results are content metadata related to contents stored in the repositories 110a-110N. In some examples, results may further comprise repository metadata of the repositories in which digital contents are stored. In such examples, when the federated search completes cycling through all repositories 110a-110N, the results are passed back, by the content web service 109, to the processing resource 102 as a Java Script Object Notation (JSON) response.

At 304 of method 300, content metadata is displayed in the analytics visualization dashboard 103 and access to the content associated with said content metadata is provided. In some examples, the analytics visualization dashboard 103 shows the Uniform Resource Locators (URLs), thumbnails and other relevant content and repository metadata. Clicking on the links (URL or thumbnail) launches the content playback from the dashboard. The user does not need to branch out of the dashboard view to fetch the content.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2. All of the features disclosed in this specification (including any accompanying claims, abstract and drawings), and/or all of the elements of any method or process so disclosed, may be combined in any combination, except combinations where at least some of such features and/or elements are mutually exclusive.

Figure 4:
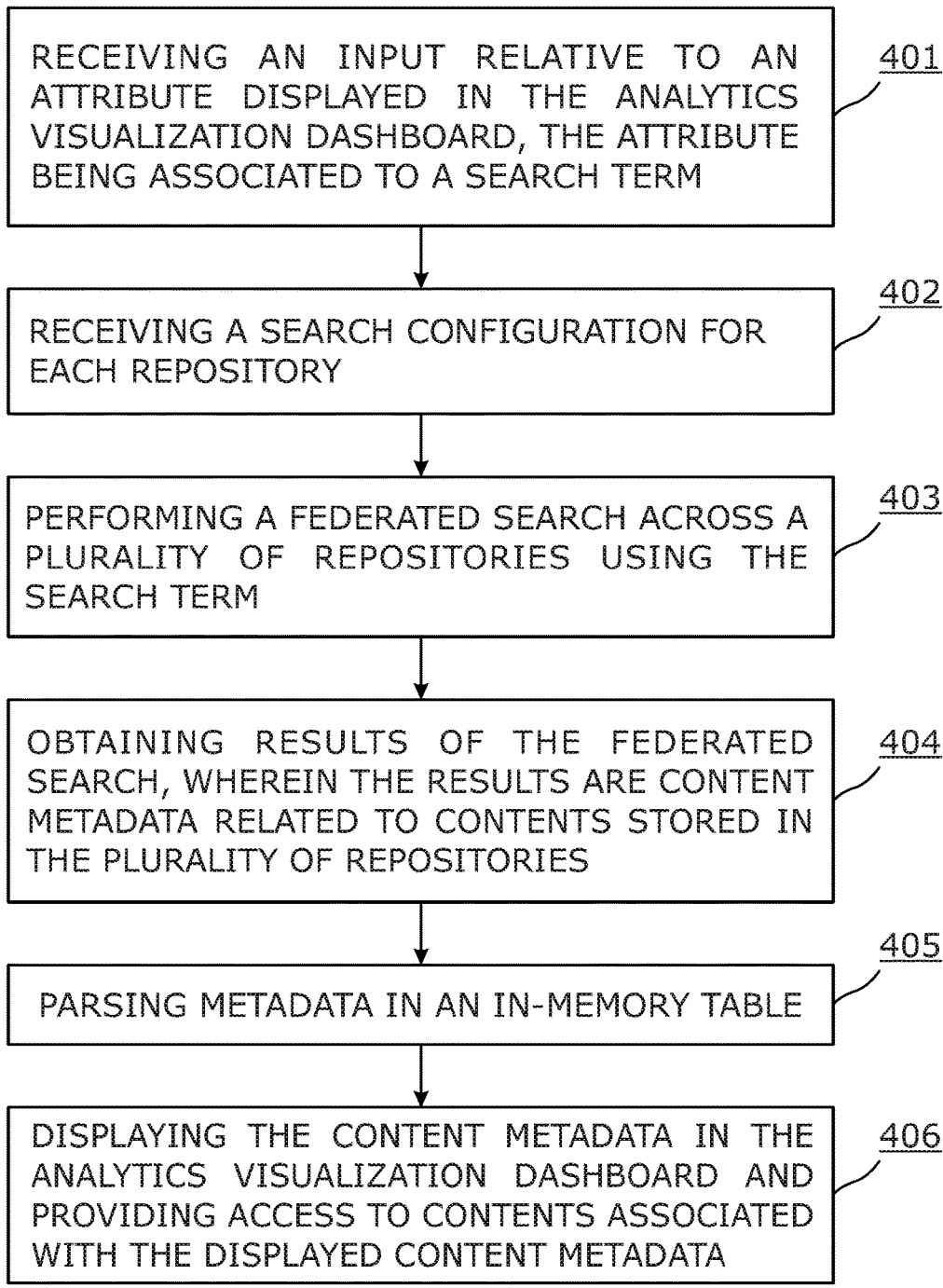
FIG. 4 is a flowchart diagram of an example method of performing a federated search across a plurality of repositories with inputs driven by an analytics visualization dashboard including receiving a search configuration for each repository that defines the metadata fields within the repository to be searched.

With reference to FIG. 4, there is shown a flowchart diagram of an example method of performing a federated search across a plurality of repositories with inputs driven by an analytics visualization dashboard including receiving a search configuration for each repository that defines the metadata fields within the repository to be searched. Although execution of method 400 is described below with reference to computing infrastructure 200 of FIG. 2, other suitable systems for the execution of method 400 may be utilized. Additionally, implementation of method 400 is not limited to such examples.

At 401 of method 400, an input relative to an attribute 206a displayed in the analytics visualization dashboard 205 may be received by the processing resource 202. The attribute may be associated to a search term. In such examples, the input may be received in response to a clicking of a user on a specific attribute on a plot of the analytics visualization dashboard 205. In an example, an attribute corresponding to a single dot in a plot in the analytics visualization dashboard 205 may be clicked. This single dot, for example, may represent several tweets and it may comprise the search term "Titan".

At 402 of method 400, the content web service 209 receives a search configuration, generated by the search configuration generator engine 214, for the repositories in which the federated search is going to be performed. The search configuration is sent from the search configuration generator engine 214 to the analytics visualization dashboard 205. In some examples, the content web service 209 is able to search different repositories 210a-210N sequentially and fetch results. The search configuration may comprise a specific configuration for each repository type wherein search field definitions are defined to specify which metadata fields within the repository have to be searched against the search term and the limit on the number of results retrieved. In the example cited in the previous paragraph, the received search configuration may determine that the federated search should be performed against a first repository for a match in a single metadata field called 'Title', while the same federated search should be performed against a second repository for a match in the metadata fields called 'Description' and 'Name'. The content web service 209 may store the search configurations and their corresponding Java linkers to the corresponding repositories, so each search configuration is executed in its corresponding repository by means of its corresponding Java linker.

At 403 of method 400, the processor resource 202 launches a federated search across a plurality of repositories 210a-210N using the search term associated with the selected attribute. The federated search may be invoked using a web service invoker by clicking on a button residing in the analytics visualization dashboard. By clicking on the button, a web service invoker initiates a Representational State Transfer (Rest) Application Programming Interface (API) call to the content web service 209 passing the search term of the attribute to the content web service 209, that perform the federated search. The web service invoker may also forward the search configuration previously sent to the analytics visualization dashboard 205 to the content web service 209.

The content web service 209 may have security tokens offered by the various repositories 210a-210N to manage authentication aspects. It executes different types of API function calls depending on the repository type. This content web service 209 may perform the federated searches across different repository types, such as but not limited to, a digital asset management system for a movie company, a social media site hosting several videos submitted by public, a home grown digital asset archive for a company written in Java, any content management system or a document library.

At 404 of method 400, the results of the federated search are obtained wherein said results are content metadata related to contents stored in the repositories 210a-210N. In some examples, results may further comprise repository metadata of the repositories 210a-210N in which digital contents are stored. In such examples, when the federated search completes cycling through all repositories 210a-210N, the results are passed back, by the content web service 209, to the processing resource 202 as a JSON response. For the example mentioned above, the federated search would be performed using as search term the string "Titan", so content metadata related to said string should be searched. In said example, the federated search would return content metadata, including a link to the content, of the trailer of the movie 'Titanic', the music video 'Attack on Titan theme song" and also a dance video "Theme Song of Attack on Titan with this Indian Movie" from the specific fields defined in the search configuration in the first and second repositories cited above. Content related to the football team 'Titan' from Tennessee could also be found in this search.

At 405 of method 400, metadata may be parsed back to an in-memory table format (rows and columns) when results are metadata in eXtensible Markup Language (XML) format. The in-memory table may contain fields such as Repository Name, Thumbnail URL, Image/Video URL etc. This in-memory table may become a data source for the analytics visualization dashboard. In some examples, the web service invoker residing in the analytics visualization dashboard 205 takes the JSON response and populates the results in the in-memory table.

At 404 of method 400, content metadata is displayed in the analytics visualization dashboard 205 and access to the contents associated with said content metadata is provided. In some examples, the analytics visualization dashboard 205 shows the URLs, thumbnails and other relevant content and repository metadata. Clicking on the links (URLs, thumbnails) launches the content playback from its repository location. The user does not need to branch out of the dashboard view to fetch the content.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the elements of any method or process so disclosed, may be combined in any combination, except combinations where at least some of such features and/or elements are mutually exclusive.

The solution herein described present many advantages, including a user operated analytics visualization dashboard controls such as drill downs, filters etc. and where the federated search is automatically driven by clicking attributes, rather than typing search terms in a search box; and, the results of the federated search are then presented in the analytics visualization dashboard itself allowing the user to launch content (when needed for viewing or playing back) from the same analytics visualization dashboard instead of going to a separate window.

What is claimed is:

1. A method comprising:
receiving, by a computing platform, an input indicating a Graphical User Interface (GUI) selection of an attribute displayed in an analytics visualization dashboard, wherein the selected attribute is associated with a search term;
performing, by the computing platform, a federated search across a plurality of repositories using the search term and through a content web service, wherein the federated search includes a specific search for each repository that is based on a search configuration for each repository type, and wherein the search configuration includes search field definitions that specify metadata fields to be searched against the search term and a limit on a number of results retrieved;
forwarding at least one search configuration for the plurality of repositories to the content web service;
obtaining, by the computing platform, results of the federated search performed in the plurality of repositories, wherein the results are content metadata associated to the search term, the content metadata relating to contents stored in the plurality of repositories, and the content metadata further comprising links to the contents;
sending the at least one search configuration for the plurality of repositories to the analytics visualization dashboard for display; and
displaying the at least one search configuration for the plurality of repositories and the content metadata in the analytics visualization dashboard and providing access, through the links in the analytics visualization dashboard, to the contents associated with the displayed content metadata.

2. The method of claim 1, wherein the results provided are content metadata comprising the search term associated to the attribute.

3. The method of claim 1, wherein content metadata is metadata in XML format.

4. The method of claim 3, wherein providing results of the federated search comprises parsing the XML metadata in an in-memory table.

5. The method of claim 1, wherein the content metadata displayed in the analytics visualization dashboard at least comprises a source repository name, a content title, a thumbnail Uniform Resource Locator (URL) and a content URL.

6. The method of claim 1, wherein the federated search across the plurality of repositories is performed by a web service invoker scripted in the analytics visualization dashboard, and wherein the web service invoker is to generate Representational State Transfer (Rest) Application Programming Interface (API) calls to the content web service to perform the federated search in the plurality of repositories.

7. The method of claim 1, wherein the results of the federated search are provided by the repositories to the content web service as a Java Script Object Notation (JSON) object.

8. An article comprising at least one non-transitory machine readable storage medium comprising instructions executable by a processor resource of a computing platform to:
receive an input indicating a Graphical User Interface (GUI) selection of an attribute displayed in an analytics visualization dashboard, wherein the selected attribute is associated with a search term;
receive a search configuration for each repository of a plurality of repositories, wherein each search configuration defines at least one metadata field within the repository to be searched against the search term and a limit on a number of results retrieved;
perform a federated search across the plurality of repositories using the search term and through a content web service, wherein the federated search includes a specific search based on the search configuration for each repository of the plurality of repositories;
forward at least one search configuration for the plurality of repositories to the content web service;
obtain results of the federated search performed in the plurality of repositories, wherein the results are content metadata associated to the search term, the content metadata relating to contents stored in the plurality of repositories and the content metadata further comprising links to the contents;
send the at least one search configuration for the plurality of repositories to the analytics visualization dashboard for display; and
display the at least one search configuration for the plurality of repositories and the content metadata in the analytics visualization dashboard and provide access, through the links in the analytics visualization dashboard, to the contents associated with the displayed content metadata.

9. The article of claim 8, wherein the results are content metadata in XML, format that at least comprise a source repository identifier, a title, a thumbnail URL and a content URL.

10. The article of claim 8, wherein the instructions to perform a federated search across the plurality of repositories comprise instructions to generate Representational State Transfer (Rest) Application Programming Interface (API) calls to the content web service to perform the federated search in the plurality of repositories.

11. The article of claim 9, wherein the instructions to obtain results of the federated search comprise instructions to parse the XML metadata in an in-memory table.

12. A system comprising:
a display device to display an analytics visualization dashboard showing a plurality of attributes; and
a computing platform to:
receive an input indicating a Graphical User Interface (GUI) selection of one of the attributes displayed in the analytics visualization dashboard, wherein the selected attribute is associated with a search term;
perform a federated search across a plurality of repositories using the search term and through a content web service;
obtain results of the federated search performed in the repositories, wherein the results are content metadata associated to the search term, the content metadata relating to contents stored in the repositories and the content metadata further comprising links to the contents;
generate search configurations for each one of the plurality of repositories, wherein each search configuration defines at least one metadata field within the repository to be searched against the search term and a limit on a number of results retrieved;
forward at least one search configuration for the plurality of repositories to the content web service; and
send the at least one search configuration for the plurality of repositories to the analytics visualization dashboard for display; and
wherein a dashboard engine is further to utilize the display device to display the at least one search configuration for the plurality of repositories and the content metadata in the analytics visualization dashboard and provide access, through the links in the analytics visualization dashboard, to the contents associated with the displayed content metadata.

13. The system of claim 12, wherein the computing platform comprises an in-memory table to store the content metadata results of the federated search, the results being previously parsed.

14. The system of claim 12, wherein the analytics visualization dashboard comprises a web service invoker to generate Representational State Transfer (Rest) Application Programming Interface (API) calls to the content web service to perform the federated search in the plurality of repositories.

* * * * *